US009850372B2

(12) United States Patent
Bodart et al.

(10) Patent No.: US 9,850,372 B2
(45) Date of Patent: Dec. 26, 2017

(54) COMPOSITION BASED ON A VINYL HALIDE POLYMER

(71) Applicant: SOLVAY SA, Brussels (BE)

(72) Inventors: Vincent Bodart, Namur (BE); Claudine Bloyaert, Waterloo (DE); Dirk Dompas, Hofstade (BE)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 14/683,481

(22) Filed: Apr. 10, 2015

(65) Prior Publication Data
US 2015/0218361 A1 Aug. 6, 2015

Related U.S. Application Data

(63) Continuation of application No. 13/123,785, filed as application No. PCT/EP2009/063232 on Oct. 12, 2009, now abandoned.

(30) Foreign Application Priority Data

Oct. 14, 2008 (FR) ..................... 08.56965
Oct. 14, 2008 (FR) ..................... 08.56966

(51) Int. Cl.
C08L 33/08 (2006.01)
C08F 14/06 (2006.01)
C08F 214/06 (2006.01)
C08J 5/18 (2006.01)
C08L 27/06 (2006.01)
C08L 97/02 (2006.01)
B29C 43/24 (2006.01)
C08F 220/18 (2006.01)
B29K 27/06 (2006.01)
B29K 33/04 (2006.01)

(52) U.S. Cl.
CPC .............. C08L 33/08 (2013.01); B29C 43/24 (2013.01); C08F 14/06 (2013.01); C08F 214/06 (2013.01); C08J 5/18 (2013.01); C08L 27/06 (2013.01); C08L 97/02 (2013.01); B29K 2027/06 (2013.01); B29K 2033/04 (2013.01); C08F 2220/1825 (2013.01); C08J 2327/06 (2013.01); C08J 2333/08 (2013.01); C08L 2203/16 (2013.01); C08L 2205/03 (2013.01); C08L 2205/16 (2013.01)

(58) Field of Classification Search
CPC .. C08L 2666/02; C08L 97/02; C08L 2203/16; C08L 33/08; C08L 27/06; C08L 2205/03; C08L 2666/04; C08F 2220/1825; C08F 220/18; C08F 214/06; C08F 14/06; C08F 2/18; C08K 3/0083; C08K 3/0091; C08K 14/06; C08K 5/10; C08J 2327/06; C08J 2333/08; C08J 5/18; B29C 43/24; B29K 2027/06

USPC .................. 524/13, 523; 525/214, 384, 197; 264/197
See application file for complete search history.

(56) References Cited

U.S. PATENT DOCUMENTS

| | | | |
|---|---|---|---|
| 3,716,524 A | 2/1973 | Cenci | |
| 3,809,667 A | 5/1974 | Coaker et al. | |
| 3,919,137 A * | 11/1975 | Dyer ..................... | C08F 259/04 525/252 |
| 4,048,260 A | 9/1977 | Haaf et al. | |
| 4,051,200 A | 9/1977 | Simak et al. | |
| 4,158,736 A | 6/1979 | Lewis et al. | |
| 4,746,705 A * | 5/1988 | Courtis ................. | C08F 265/04 524/523 |
| 4,986,760 A | 1/1991 | Petersen et al. | |
| 5,061,747 A | 10/1991 | Roach et al. | |
| 5,643,561 A | 7/1997 | Katsuen et al. | |
| 5,858,522 A | 1/1999 | Turk et al. | |
| 5,942,581 A | 8/1999 | Nakamura et al. | |
| 5,985,429 A | 11/1999 | Plummer et al. | |
| 6,011,091 A | 1/2000 | Zehner | |
| 6,538,057 B1 | 3/2003 | Wildburg et al. | |
| 7,030,179 B2 | 4/2006 | Patterson et al. | |
| 7,378,462 B1 | 5/2008 | Hughes et al. | |

(Continued)

FOREIGN PATENT DOCUMENTS

EP 0195522 A2 9/1986
EP 0284058 A2 9/1988
(Continued)

OTHER PUBLICATIONS

Nandi et al., "Chain Transfer of Alcohols in the Polymerization of Acrylic Esters," Makromol. Chem. 183, 1467-1472 (1982).*
"International Standard ISO 1628-2, Dec. 1, 1998, 2nd Ed. "Determination of the viscoty of polymers in dilute solution usi,g capillary viscosimeters—Part 2: poly(vinyl chloride) resins", ref ISO 1628-2:1998(E), 19 p.".
"Deutsche Norm DIN 51562-1, Jan. 1999, Viscosimetry—Determination of kinematic viscosity using the Ubbelohde viscosimeter", 4 parts, ref DIN 51562:1999-01, 26 p.
(Continued)

Primary Examiner — Josephine Chang
(74) Attorney, Agent, or Firm — Jarrod N. Raphael; Nikhil Patel

(57) ABSTRACT

Composition comprising at least one vinyl halide polymer and 0.1 to 5% by weight, relative to the weight of the vinyl halide polymer, of at least one polymer of at least one acrylic ester obtained by polymerization in solution in a liquid medium comprising at least one chain transfer agent chosen among the $C_3$-$C_{20}$ hydrocarbons containing at least one secondary alcohol function. Process for its manufacture, article obtained starting from this composition and use of this composition for manufacturing sheets and films via calendaring or for manufacturing profiles by extrusion. Process for the manufacture of a polymer of at least one acrylic ester which can be used in the composition.

15 Claims, No Drawings

(56) References Cited

U.S. PATENT DOCUMENTS

| | | |
|---|---|---|
| 2006/0189731 A1 | 8/2006 | Girois et al. |
| 2007/0105984 A1* | 5/2007 | Griffin .................... C08L 97/02 524/31 |
| 2009/0143547 A1 | 6/2009 | Lin et al. |

FOREIGN PATENT DOCUMENTS

| | | |
|---|---|---|
| EP | 0483051 A1 | 4/1992 |
| EP | 0897953 A1 | 2/1999 |
| EP | 01426428 A1 | 6/2004 |
| FR | 02318201 A1 | 2/1977 |
| JP | 06056510 A | 3/1994 |
| JP | 08333469 A | 12/1996 |
| JP | 10182911 A | 7/1998 |
| JP | 10219072 A | 8/1998 |
| JP | 10273571 A | 10/1998 |
| JP | 10330568 A | 12/1998 |
| JP | 11189693 A | 7/1999 |
| JP | 11189694 A | 7/1999 |
| JP | 2002264279 A | 9/2002 |
| JP | 2006083334 A | 3/2006 |
| WO | 2005090469 A1 | 9/2005 |
| WO | 2006064226 A1 | 6/2006 |

OTHER PUBLICATIONS

Jiang H. et al. "Development of poly(vinyl chloride)/Wood Composites. A Literature Review" in J. of Vinyl and Additive technology, 2004, Jun., V 10, n. 2, p. 59-69.

Sombatsompop N. et al. "Effects of Acrylic-Based Processing Aids on Processibility, Rheology, Thermal and Structural Stability, and Mechanical Properties of PVC/Wood-Sawdust Composites" in J Applied Polymer Science, 2004, Apr. 15, V 92, n. 2 p. 782-790; Wiley Periodicals.

Mengelou F. et al. "Effects of Impacts Modifiers on the Properties of Rigid PVC/Wood-Fiber Composites" in ANTEC 2000 Conference Proceedings, V 3—Secial Areas, p. 3409-3413, May 7-11, Orlando, Florida, USA.

* cited by examiner

COMPOSITION BASED ON A VINYL HALIDE POLYMER

CROSS-REFERENCE TO RELATED APPLICATIONS

This application is a continuation of U.S. patent application Ser. No. 13/123,785, filed Apr. 12, 2011, which is the U.S. national stage entry under 35 U.S.C. §371 of International Application No. PCT/EP2009/063232 filed Oct. 12, 2009, which claims priority to French Application No. 08.56965 filed Oct. 14, 2008 and French Application No. 08.56966 filed Oct. 14, 2008, these applications being herein incorporated by reference in their entirety for all purposes.

The present invention relates to a composition based on a vinyl halide polymer comprising at least one acrylic ester polymer. It also relates to a process for preparing such composition, and also to articles and parts of articles made from such composition and to the use of such composition for manufacturing sheets and films via calendaring or for manufacturing profiles by extrusion. It also relates to a process for preparing the acrylic ester polymer.

Compositions based on poly(vinyl chloride) (PVC) that can be used for manufacturing, via calendering, transparent sheets have been described in document EP-A-0897953, the content of which is incorporated by reference in the present description. According to this document, in order to be able to obtain transparent sheets that do not adhere to the calendering rolls, 0.1 to 2% by weight of a low molecular weight polyacrylate is incorporated into said compositions. This polyacrylate is obtained by polymerization, in aqueous emulsion, of at least one $C_1$-$C_4$ acrylic ester.

It has however been observed that these PVC-based compositions have drawbacks. On the one hand, the chain transfer agent used to reduce the molecular weight of the polyacrylate is advantageously a mercaptan (dodecyl mercaptan), which gives an undesirable colouring to sheets calendered from these compositions. On the other hand, the presence of an emulsifier (for example, the sodium salt of dodecyl diphenyl ether sulphonate) in the acrylic ester polymerization medium generates a heterogeneous particle size distribution of the particles of said compositions, leading to compositions characterized by a very low bulk density.

The present invention aims to provide a composition based on a vinyl halide polymer that does not adhere to the processing devices, more particularly to the calendering rolls, while not exhibiting the aforementioned drawbacks.

The present invention therefore mainly relates to a composition comprising:
at least one vinyl halide polymer; and
0.1 to 5% by weight, relative to the weight of the vinyl halide polymer, of at least one polymer of at least one acrylic ester obtained by polymerization in solution in a liquid medium comprising at least one chain transfer agent chosen among the $C_3$-$C_{20}$ hydrocarbons containing at least one secondary alcohol function.

The composition according to the invention comprises at least one vinyl halide polymer.

In the present description, the expression "at least one vinyl halide polymer" is understood to mean one or more vinyl halide polymers.

Preferably, the composition according to the invention comprises one vinyl halide polymer.

In the remainder of the text, the expression "vinyl halide polymer" used in the singular or plural should be understood as denoting one or more vinyl halide polymers, except where denoted otherwise.

In the present description, the expression "vinyl halide polymer" is understood to mean polymers containing at least around 50% by weight, preferably at least 60%, particularly preferably at least 70% by weight and more particularly preferably at least 85% by weight of monomer units derived from vinyl halide, therefore both vinyl halide homopolymers and vinyl halide copolymers with one or more ethylenically unsaturated monomers. As examples of ethylenically unsaturated monomers that are copolymerizable with the vinyl halide, mention may be made of chlorinated monomers such as vinylidene chloride, fluorinated monomers such as vinylidene fluoride, vinyl esters such as vinyl acetate, vinyl ethers such as vinyl methyl ether, dialkyl maleates such as dibutyl maleate, (meth)acrylic monomers such as n-butyl acrylate and methyl methacrylate, styrene monomers such as styrene, olefin monomers such as ethylene, propylene and butadiene. Vinyl esters, especially vinyl acetate, are particularly preferred as monomers that are copolymerizable with the vinyl halide. Among all the vinyl halide polymers mentioned above, preference is accorded to vinyl chloride polymers (homopolymers and copolymers), more particularly to vinyl chloride homopolymers. The vinyl chloride homopolymers that are more particularly preferred are the vinyl chloride homopolymers having an average molecular weight such that their "K-value", measured according to the ISO 1628-2 standard, is advantageously between 30 and 90, preferably between 40 and 80, more particularly between 50 and 75.

The vinyl halide polymers present in the composition according to the invention are advantageously obtained by polymerization, in aqueous suspension, of the vinyl halide and of the optional other ethylenically unsaturated monomers (comonomers) mentioned above. When these comonomers are present, the polymerization medium advantageously contains advantageously at least 50% by weight of the vinyl halide relative to the total weight of the monomers.

The polymerization in aqueous suspension of the monomers is carried out in a manner well known to a person skilled in the art, in the presence of conventional ingredients, for instance:
protective colloids, such as partially saponified polyvinyl alcohol and cellulose ethers, for example;
initiators that are soluble in the monomers, such as peroxides, for example dilauryl peroxide, di-t-butyl peroxide and dibenzoyl peroxide; hydroperoxides, for example t-butyl hydroperoxide; peresters, for example t-butyl perpivalate, t-butyl 2-ethyl hexanoate and t-butyl perneodecanoate; percarbonates, for example diethyl peroxydicarbonate and diisopropyl peroxydicarbonate and di-n-butyl peroxydicarbonate; azo compounds, for example azobisisobutyronitrile;
pH regulators, such as buffer salts, for example sodium phosphate, polyphosphate and hydrogen carbonate.

The polymerization temperature is advantageously adjusted so as to obtain the "K-value" desired for the vinyl halide polymer. Usually, this temperature is between 20 and 100° C., preferably between 30 and 90° C., more particularly between 45 and 85° C. The polymerization is advantageously carried out under a pressure of between 3 and 25 bar, preferably between 5 and 19 bar.

As mentioned, the composition according to the invention also comprises at least one polymer of at least one acrylic ester.

In the present description, the expression "at least one polymer" is understood to mean one or more polymers.

Preferably, the composition according to the invention comprises one polymer of at least one acrylic ester.

In the remainder of the text, the expression "polymer of at least one acrylic ester" used in the singular or plural should be understood as denoting one or more polymer of at least one acrylic ester, except where denoted otherwise.

In the present description, the expression "at least one acrylic ester" is understood to mean one or more acrylic esters.

In the remainder of the text, the expression "acrylic ester" used in the singular or plural should be understood as denoting one or more acrylic esters, except where denoted otherwise.

In the remainder of the present description, the expression "acrylic ester polymer" is understood to mean polymers containing at least around 50%, preferably at least 60%, in a preferred manner at least 85% by weight of monomer units derived from one or more acrylic or methacrylic esters (grouped hereinbelow in the present description under the generic term "acrylic esters", it being understood that esters derived from acrylic acid are preferred). The best results are obtained with polymers that contain only monomer units derived from one or more acrylic esters and preferably from at least two acrylic esters. These may therefore be homopolymers or copolymers, preferably copolymers. The polymerizable acrylic esters are advantageously chosen from acrylic acid esters or methacrylic acid esters derived from $C_1$-$C_8$ alcohols.

Among the acrylic esters that can be used according to the present invention, mention may be made of:
  acrylic acid esters and methacrylic acid esters derived from $C_1$-$C_8$ aliphatic monoalcohols, such as methanol, ethanol, isopropanol, n-butanol, isobutanol, n-hexanol and 2-ethylhexanol, and also mixtures of these esters;
  acrylic acid esters and methacrylic acid esters derived from $C_1$-$C_8$ aliphatic diols, such as ethylene glycol, propylene glycol and 1,4-butanediol, and also mixtures of these esters with one another or with the abovementioned esters derived from aliphatic monoalcohols.

Preferred acrylic esters are the acrylic acid esters derived from $C_1$-$C_8$ aliphatic monoalcohols, in particular the acrylic acid esters derived from methanol and n-butanol (methyl acrylate and n-butyl acrylate). The acrylic ester polymer is therefore preferably a polymer of acrylic acid esters derived from $C_1$-$C_8$ aliphatic monoalcohols. Excellent results have been obtained with copolymers containing monomer units resulting from mixtures comprising methyl acrylate and n-butyl acrylate. The acrylic ester is particularly preferably a mixture of acrylic esters composed of methyl acrylate and n-butyl acrylate. The acrylic ester polymer is therefore particularly preferably a copolymer containing monomer units resulting from a mixture comprising methyl acrylate and n-butyl acrylate. These mixtures advantageously comprise at least 50% by weight of n-butyl acrylate, preferably at least 55% by weight n-butyl acrylate, more particularly at least 60% by weight of n-butyl acrylate. Moreover, these mixtures advantageously comprise at most 50% by weight of methyl acrylate, preferably at most 45% by weight of methyl acrylate, more particularly at most 40% by weight of methyl acrylate.

The acrylic ester polymer present in the composition according to the invention is obtained by polymerization in solution in a liquid medium comprising at least one chain transfer agent chosen among the $C_3$-$C_{20}$ hydrocarbons containing at least one secondary alcohol function. This polymerization in solution constitutes another subject of the present invention. The mechanisms of this polymerization may be, in a manner known to a person skilled in the art, of the radical, anionic or cationic type. Radical polymerization is preferred.

In the present description, the expression "liquid medium" is understood to mean any medium that is in the liquid state under the polymerization conditions.

In the present description, the expression "at least one chain transfer agent chosen among the $C_3$-$C_{20}$ hydrocarbons containing at least one secondary alcohol function" is understood to mean that liquid medium comprises one or more than one chain transfer agent chosen among the $C_3$-$C_{20}$ hydrocarbons containing at least one secondary alcohol function.

Preferably, the liquid medium comprises one chain transfer agent chosen among the $C_3$-$C_{20}$ hydrocarbons containing at least one secondary alcohol function.

In the remainder of the text, the expression "chain transfer agent" used in the singular or plural should be understood as denoting one or more than chain transfer agent, except where denoted otherwise.

The chain transfer agent is advantageously the main constituent, of the liquid medium in which the polymerization of the acrylic esters is carried out, either that it is deliberately introduced into this liquid medium, the latter thus being inert, or that it constitutes, by itself, this liquid medium.

The polymerization of the acrylic esters (monomers) is advantageously carried out by putting the ester or the mixture of esters to be polymerized into solution in the liquid medium comprising the chain transfer agent, in the presence of at least one initiator that is soluble in the monomer or in the liquid medium. In the preferred case where the polymerization in solution of the acrylic esters is of the radical type, this initiator is a free-radical initiator. For the sake of simplicity, the initiator will be denoted by the latter term (free-radical initiator) in the remainder of the present description, without however limiting the scope of the invention thereto.

The chain transfer agent according to the present invention is chosen among the $C_3$-$C_{20}$ hydrocarbons containing at least one secondary alcohol function.

In the present description, the expression "secondary alcohol function" is understood to mean an alcohol function which is borne by a secondary carbon i.e. a carbon atom linked to two other carbons (general formula R—CHOH—R').

The $C_3$-$C_{20}$ hydrocarbons can be aliphatic hydrocarbons or aromatic hydrocarbons, preferably they are aliphatic $C_3$-$C_{20}$ hydrocarbons containing at least one secondary alcohol function.

By "at least one secondary alcohol function", it is meant that the $C_3$-$C_{20}$ hydrocarbons may contain one or more than one secondary alcohol function. Preferably, the $C_3$-$C_{20}$ hydrocarbons contain one secondary alcohol function.

The chain transfer agent is therefore more preferably chosen among the aliphatic $C_3$-$C_{20}$ hydrocarbons containing one secondary alcohol function.

The number of carbon atoms of the hydrocarbon is of at least 3. The number of carbon atoms of the hydrocarbon is of at most 20, preferably of at most 12, more preferably of at most 8 and most preferably of at most 6.

Aliphatic $C_3$-$C_8$ hydrocarbons containing one secondary alcohol function are particularly preferred, with a particular preference for aliphatic $C_3$-$C_6$ hydrocarbons containing one secondary alcohol function such as isopropanol, sec-butyl alcohol, 2-pentanol, 2-hexanol, 2-heptanol and 2-octanol. Isopropanol is most particularly preferred.

As has been said, the chain transfer agent may be introduced into the liquid medium in which the polymerization of the acrylic esters is carried out. This liquid medium is then advantageously an inert solvent such as a saturated aliphatic hydrocarbon (hexane, etc.), an aromatic hydrocarbon (toluene, benzene, etc.) or an alcohol different from those possibly carrying out the chain transfer agent function (methanol, etc.).

Preferably, the chain transfer agent is liquid at the temperature at which the polymerization takes place and more preferably constitutes this liquid medium. The liquid medium consists therefore more preferably of at least one chain transfer agent chosen among the $C_3$-$C_{20}$ hydrocarbons containing at least one secondary alcohol function, with the preference defined above for the chain transfer agent.

According to the invention, the amount of liquid medium used in the course of the polymerization of the acrylic esters is sufficient to dissolve therein the total amount of acrylic esters present.

In the preferred variant of the invention according to which the chain transfer agent itself constitutes this liquid medium, the amount of said transfer agent used, defined by its volume expressed in liters (l), is sufficient to dissolve therein the total amount of acrylic esters present, defined by its weight expressed in kilograms (kg). In this way it is possible to obtain a low molecular weight acrylic ester polymer, particularly suitable for producing the composition according to the main subject of the invention. The expression "low molecular weight acrylic ester polymer" is understood to mean, within the present description, an acrylic ester polymer for which the "K-value" (measured on a 0.5 wt % solution of polymer in cyclohexanone with an Ubbelohde microviscometer according to the DIN 51562 standard) is between 12 and 25, preferably between 15 and 22.

Thus, the ratio of the weight of acrylic esters (kg) to the volume of chain transfer agent (l) is advantageously less than or equal to 8/1, preferably less than or equal to 7/1, more particularly less than or equal to 5/1. The ratio of the weight of acrylic esters to the volume of chain transfer agent is advantageously greater than or equal to 0.5/1, preferably greater than or equal to 1/1, more particularly greater than or equal to 1.5/1. Good results were obtained when the ratio of the weight of acrylic esters to the volume of chain transfer agent is greater than or equal to 1.5/1 and less than or equal to 5/1. The best results were obtained when the chain transfer agent itself constitutes the liquid medium in which the polymerization takes place and when the ratio of the weight of acrylic esters to the volume of liquid medium is between 4/1 and 2/1.

The free-radical initiator, in the presence of which the polymerization of the acrylic esters is carried out, preferably is advantageously chosen from those that are liquid or sufficiently soluble in the liquid medium in which the polymerization is carried out and that have a half-life time, at the polymerization temperature, of between 10 seconds and 3 hours. They are preferably chosen from the initiators mentioned above by way of the conventional ingredients in the presence of which the polymerization in aqueous suspension of the vinyl halide is carried out, that is to say from peroxides, hydroperoxides, peresters, percarbonates and azo compounds. Particularly preferred free-radical initiators are peresters and peroxides and, from among the latter, t-butyl per-2-ethylhexanoate and di-t-butyl peroxide respectively.

The use of several free-radical initiators also falls within the scope of the invention.

The amount of free-radical initiator present in the liquid medium in which the polymerization of the acrylic esters is carried out is advantageously between 0.05 and 3% by weight relative to the weight of acrylic esters, preferably between 0.15 and 1.5% by weight relative to the weight of acrylic esters.

The polymerization of the acrylic esters according to the invention is advantageously carried out in a sealed reactor equipped with stirring means and in which a partial vacuum is induced. The polymerization temperature is advantageously greater than or equal to 75° C., preferably greater than or equal to 80° C., more particularly greater than or equal to 95° C. This temperature advantageously does not exceed 130° C., it is preferably less than or equal to 120° C., more particularly less than or equal to 110° C.

According to one preferred embodiment of the process for preparing a polymer of at least one acrylic ester, which can be used in the composition according to the invention, the acrylic ester is polymerized in solution in a liquid medium comprising at least one chain transfer agent chosen among the $C_3$-$C_{20}$ hydrocarbons containing at least one secondary alcohol function in the presence of a free-radical initiator, at a temperature above 80° C. and below 130° C.

The polymerization of the acrylic esters according to the invention is advantageously continued for a duration of greater than or equal to 30 minutes, preferably of greater than or equal to 3 hours. This duration advantageously does not exceed 10 hours, preferably does not exceed 6 hours.

It may be advantageous to carry out this polymerization by introducing into the reactor firstly a first portion of the acrylic esters to be polymerized and, respectively, a first portion of the liquid medium comprising the chain transfer agent and in which the free-radical initiator is dissolved, before heating the reactor to the polymerization temperature and then adding thereto the remainder of the acrylic esters and of the liquid medium. Said first portions introduced advantageously represent from 1 to 15%, preferably from 1.5 to 5% by weight, relative to the total weight of acrylic esters introduced and, respectively, advantageously from 60 to 95%, preferably from 65 to 85% by volume, relative to the total volume of the liquid medium introduced. It appears indeed to be preferable, in order to promote the chain transfer function of the liquid medium at the expense of the growth of the polymer chains, for the volume of the first portion of liquid medium introduced to be substantially higher than the weight of the first portion of acrylic esters introduced.

The acrylic ester polymer obtained is advantageously characterized, besides a low molecular weight, by the fact that its solution in the liquid medium of polymerization at a concentration of 77.3% by weight is characterized by a remarkably low viscosity, advantageously of less than or equal to 500 mPa·s, preferably of less than or equal to 400 mPa·s.

Good results were obtained with copolymers of methyl acrylate and n-butyl acrylate characterized by the combination of a "K-value" of between 12 and 25 and a viscosity (23° C.) of its solution in the liquid medium of polymerization at a concentration of 77.3% by weight of less than or equal to 500 mPa·s.

For the production of the composition according to the invention, the acrylic ester polymer obtained as described above may be incorporated by any appropriate means into the vinyl halide polymer described above.

Thus, said polymer may be incorporated in solid form or in the form of a solution, containing advantageously from 30 to 99, preferably from 30 to 80% by weight of polymer, by kneading with the molten vinyl halide polymer. This kneading may be carried out for example in an extruder at temperatures advantageously of between 160 and 200° C., preferably between 170 and 195° C.

It is also possible, preferably, to add the acrylic ester polymer in solid form or in the form of a solution (concentration as defined above) to the medium for polymerization of the vinyl halide and of the optional other comonomers mentioned above. The process for manufacturing the composition according to the invention is particularly preferably carried out by polymerizing the vinyl halide and its optional comonomers in aqueous suspension in the presence of a solution of the acrylic ester polymer. The latter method has an unexpected advantage linked to the fact that the incorporation of acrylic ester polymer, in particular of low molecular weight acrylic ester polymer, into the vinyl halide polymerization medium in the form of low viscosity solutions makes it possible either to handle them and pump them more easily in the vinyl halide polymerization reactor or to increase the concentration thereof without generating too high a viscosity of the polymerization medium.

Regardless of the method of incorporation chosen, the amount of acrylic ester polymer must be such that the composition obtained advantageously contains from 0.1 to 5% by weight, relative to the weight of vinyl halide polymer present, of this acrylic ester polymer. Preferably, the composition contains at least 0.3% by weight (thus expressed) of acrylic ester polymer, more particularly at least 0.8% by weight. Preferably, the composition contains at most 3% by weight of acrylic ester polymer, more particularly at most 2% by weight.

The composition according to the invention preferably further comprises at least one natural organic filler.

In the present description, the expression "at least one natural organic filler" is understood to mean one or more one natural organic fillers.

In the remainder of the text, the expression "natural organic filler" used in the singular or plural should be understood as denoting one or more natural organic fillers, except where denoted otherwise.

In the remainder of the present description, the expression "natural organic filler" is understood to mean any organic compound of natural origin, the constituent particles of which have an average size advantageously of between 1 and 5000 μm. These fillers may be, for example in the form of a powder, the average grain size of which is between around 25 and 250 μm, in the form of a flour, the average particle size of which is between around 1 and 25 μm and in the form of fibres, the average size of which is between around 250 and 5000 μm. Natural organic fillers that are in the form of flour or fibres are preferred, and more particularly those that are in the form of fibres. These natural organic fillers advantageously contain at least one compound chosen from cellulose, hemicelluloses and lignin. They may be, for example, jute, sisal, hemp, cotton, flax, coir, cork and wood. Wood, low-density or high-density wood, is preferred as the natural organic filler, particularly in the form of flour or fibres.

The respective proportions of the vinyl halide polymer(s) [polymer(s)] and of the natural organic filler(s) [filler(s)], present in the composition according to the invention, are such that the [polymer(s)]/[filler(s)] weight ratio is advantageously between 95/5 and 40/60, preferably between 80/20 and 45/55. The best results were recorded with a [polymer(s)]/[filler(s)] weight ratio of around 53/47.

The composition according to the invention may optionally contain other conventional ingredients or additives. These may be, for example, plasticizers, fillers, reinforcing agents, lubricants, pigments, antioxidants, UV stabilizers, heat and light stabilizers, nucleating agents, flame retardants, antistatic agents, etc.

The composition according to the invention may also contain polymers other than the vinyl halide polymers and the acrylic ester polymers described. Preferably, the vinyl halide polymers and the acrylic ester polymers described are the only polymeric constituents of these compositions.

The composition according to the invention may then contains (depending on their nature, and without the properties of the composition being fundamentally modified by them) at least 0.1% by weight, for example up to 5% by weight, and even up to 30% by weight (depending on their nature, and without the properties of the composition being fundamentally modified by them), relative to the weight of the vinyl halide polymer, of other known additives.

As known additives which may be incorporated into the compositions according to the invention, mention may be made, inter alia, of:

light stabilizers (2-hydroxybenzophenones, 2-hydroxyphenylbenzotriazoles, phenyl salicylate and sterically hindered amines for example);

heat stabilizers (salts of tin, lead, calcium, zinc, barium; epoxidized oils for example);

phenolic antioxidants (di-t-butyl-para-cresol, tetrakis {3-(3',5'-di-t-butyl-4'-hydroxyphenyl)} pentaerythritol for example);

plasticizers (phthalates for example);

fillers, other than the natural organic fillers mentioned above (carbonates, glass fibres, glass beads, kaolin, talc, silica, wollastonite, mica, carbon fibres for example);

inorganic pigments (oxides, mixed oxides, sulphides, chromates, silicates, phosphates and sulphates of metals chosen from titanium, iron, zinc, chromium, cobalt and manganese for example);

organic pigments (pigments containing azo groups and pigments derived from porphyrin for example);

acid scavengers (calcium stearate and lactate, for example);

fire retardants and flame retardants (aluminium hydroxide, magnesium hydroxide, boric acid, ammonium, sodium, calcium, barium and zinc borates, and zinc hydroxystannate for example);

blowing agents (sodium bicarbonate, and azodicarbonamide for example);

lubricants (metal stearates, dicarboxylic esters of fatty acids for example);

anti-fungal agents (isothiazolones for example);

nucleating agents (sodium benzoate for example);

processing aids (acrylic elastomers for example);

coupling agents and compatibilizers that improve the interfacial adhesion between the vinyl halide polymer and the natural organic filler when present (aminosilanes, methacryloxysilanes and epoxysilanes for example);

mechanical property (impact, etc.) modifiers (chlorinated polyethylenes, ethylene/vinyl acetate copolymers and methacrylate/butadiene/styrene elastomers, butyl acrylate elastomers crosslinked into beads for example).

When at least one natural organic filler is present in the composition according to the invention, the process for manufacturing the composition comprises advantageously at least one step (I) during which the acrylic ester polymer is firstly incorporated, by any suitable means described above, into the vinyl halide polymer in order to obtain a blend of the vinyl halide polymer and of the acrylic ester polymer. This process then advantageously comprises at least one step (II) during which at least one natural organic filler is incorporated into the blend obtained in step (I). The optional additives mentioned above may be incorporated in step (I) or, preferably, in step (II).

During step (I), the acrylic ester polymer is preferably added in the form of a solution to the vinyl halide polymerization medium.

Step (II) of the process for manufacturing the composition according to the invention may be carried out according to any known method that ensures an intimate mixing of the blend obtained in step (I), of the natural organic filler(s) and of the optional additives, in the case where the latter are added in step (II).

In the preferred case where the natural organic filler is low-density or high-density wood, in the form of flour or fibres, this wood advantageously has a moisture content that varies between 5 and 15%. It may hence prove advantageous to dry it, prior to or at the start of step (II), for example at between 75 and 125° C. for duration between 8 and 30 hours.

The ingredients of step (II) may be first dry-blended, in the required proportions, in any device suitable for this purpose such as a drum mixer. The blend intended to be melted can also be produced by the masterbatch technique. The blend thus obtained is then advantageously melted either in batch mode, in batch devices such as conventional mixers, for example Banbury, Haake or Brabender mixers, or preferably in continuous devices, such as extruders.

The natural organic filler is thus preferably incorporated during step (II) into the blend obtained in step (I), by melting in a known device.

The term "extruder" is understood to mean any continuous device comprising at least one feed zone and, at its outlet, a discharge zone preceded by a compression zone, the latter forcing the molten mass to pass through the discharge zone. The discharge zone may additionally be followed by a granulating device or by a device that gives the extruded material its final shape. Advantageously, use is made of known extruders based on the work of a single screw or, preferably, of two screws which, in the latter case, may cooperate in a co-rotating or counter-rotating manner (same direction of rotation or opposite directions of rotation).

Preferably, the extruder used according to the present invention is arranged so that it comprises, preferably successively in the order stated, at least one feed zone, one compression zone, one material melting/mixing zone, one homogenization zone, optionally one zone for introducing additives, possibly one degassing zone for discharging the residual moisture from the natural organic filler and from the vinyl halide polymer, and one compression/discharge zone.

Each of these zones has a very specific function and is at a very specific temperature.

Advantageously, step (II) of the process for manufacturing the composition according to the invention is carried out at a temperature between 25 and 200° C. and for a duration that does not usually exceed one hour, preferably between 2 and 30 minutes.

The present invention also relates to an article or part of an article comprising a composition according to the invention and also to the use of the composition according to the invention for manufacturing sheets and films via calendaring or for manufacturing profiles by extrusion.

Calendaring is particularly suitable to shape the composition and allows the manufacture of sheets and films. In such case, the composition based on a vinyl halide polymer according to the invention, besides their remarkable lack of adhesion to the processing devices, more particularly to the calendering rolls, advantageously confer a transparent appearance to the articles resulting from their implementation. They therefore allow the easy manufacture of articles or parts of articles, especially transparent sheets and films.

Extrusion moulding is also particularly suitable to shape the composition. It is also in the case of shaping composition according to the invention by extrusion moulding that this composition proves particularly advantageous since it does not give rise to an increase of the pressure in the extruder head during this moulding, while simultaneously ensuring good gelation of the polymer and conferring satisfactory mechanical properties on the articles or parts of articles thus manufactured. As examples of manufactured articles or parts of articles that contain the composition described above, mention may be made of various profiles intended for articles for the building industry (doors, windows, decking, fences, floors, skirting boards, ceilings, etc.), for the shipbuilding industry (decks and fittings for sail and motor boats, etc.) and for manufacture of furniture for inside or outside use.

The following examples are intended to illustrate the invention without however limiting the scope thereof.

EXAMPLE 1

A. Preparation of the Acrylic Ester Polymer
(Polymer A)

1164 g of n-butyl acrylate and 727 g of methyl acrylate were mixed under normal conditions (20° C.; 1 bar), in order to obtain a solution known as solution 1.

Moreover, 5.76 g of t-butyl per-2-ethylhexanoate were introduced into 120 g (153 ml) of isopropanol under normal conditions, in order to obtain a solution known as solution 2.

Introduced into a 3.5 l reactor equipped with a stirrer were 60 g of solution 1, 4.76 g of solution 2 and 350 g (446 ml) of isopropanol (acting as both the polymerization liquid medium and the chain transfer agent). The reactor was sealed, sparged 3 times with nitrogen under a pressure of 10 bar (absolute pressure, that is to say the gauge pressure measured with a manometer ("gauge") plus the atmospheric pressure) and it was degassed at atmospheric pressure.

The reactor was then put under a partial vacuum equivalent to $\frac{1}{13}^{th}$ of a bar. The stirrer was rotated at 500 rpm and the contents of the reactor were heated at 105° C.

After 30 minutes, the balance of solution 1 (1831 g) was gradually introduced over a period of 150 minutes, then the balance of solution 2 (121 g) was gradually introduced over a period of 30 minutes.

The reactor was cooled to room temperature after a total period of 270 minutes. A solution of polymer A in isopropanol was drawn off.

B. Preparation of the Composition Based on a
Vinyl Halide Polymer

Introduced into a 300 l stainless steel reactor equipped with a stirrer were:
103 l of demineralized water;
95 g of hydroxypropyl methyl cellulose sold under the name Metocel 181;
90 g of sodium tripolyphosphate;
35 g of t-butyl perneodecanoate;
50 g of dilauryl peroxide; and 0.91 kg of polymer A in the form of the solution of polymer A in isopropanol obtained in part A of Example 1.

The reactor was then sealed, sparged 3 times with nitrogen under a pressure of 12 bar and degassed at atmospheric pressure. It was then put under a partial vacuum equivalent to 400 mbar. The stirrer was rotated at 220 rpm, 70 kg of vinyl chloride were introduced into the reactor and its contents were heated at 64° C. This temperature was kept constant over the duration of the polymerization.

At the end of the polymerization, when the pressure had decreased by one bar so when the conversion rate is 79%, the reaction was stopped by injecting 200 ppm of the product IRGANOX® 1141. The stirrer was slowed down to 100 rpm and the unpolymerized vinyl chloride was degassed for 90 minutes at 80° C.

After cooling to 30° C., the composition based on a vinyl halide polymer that was obtained was filtered, washed with demineralized water and dried at 50° C. for 24 hours.

EXAMPLE 2R

This example is given by way of comparison.

A. Preparation of the Modifying Polymer (Polymer B)

1152 g of n-butyl acrylate, 720 g of methyl acrylate and 48 g of t-dodecyl mercaptide (tDDM) (conventional chain transfer agent) were mixed under normal conditions, in order to obtain a solution known as solution 3.

Moreover, 5.76 g of t-butyl per-2-ethylhexanoate were introduced into 120 g (152 ml) of methanol under normal conditions, in order to obtain a solution known as solution 4.

The preparation of polymer B was continued in a manner similar to that of polymer A described in Example 1, except that 210 g (266 ml) of methanol were introduced into the reactor and that it functioned with solutions 3 and 4 respectively as with solutions 1 and 2 in Example 1. A solution of polymer B in methanol was drawn off.

B. Preparation of the Composition Based on a Vinyl Halide Polymer

This preparation was carried out as described in point B of Example 1, except that 0.91 kg of polymer B, in the form of the solution of polymer B in methanol obtained in part A of Example 2R was introduced into the reactor.

EXAMPLE 3R

This example is given by way of comparison.

A. Preparation of the Modifying Polymer (Polymer C)

This preparation was carried out as described in point A of Example 2R. A solution of polymer C in methanol was drawn off.

B. Preparation of the Composition Based on a Vinyl Halide Polymer

Introduced into a 300 l stainless steel reactor equipped with a stirrer were:
103 l of demineralized water;
69 g of hydroxypropyl methyl cellulose sold under the name Metocel 181;
63 g of sodium tripolyphosphate;
24.5 g of t-butyl perneodecanoate;
31.5 g of dilauryl peroxide; and
0.525 kg of polymer C, in the form of the solution of polymer C in methanol obtained in part A of Example 3R.

The reactor was then sealed, sparged 3 times with nitrogen under a pressure of 12 bar and degassed at atmospheric pressure. It was then put under a partial vacuum equivalent to 400 mbar. The stirrer was rotated at 220 rpm, 70 kg of vinyl chloride were introduced into the reactor and its contents were heated at 64° C. This temperature was kept constant over the duration of the polymerization.

At the end of the polymerization, when the pressure had decreased by one bar so when the conversion rate is 79%, the reaction was stopped by injecting 200 ppm of the product Bisphenol A as a 50% methanolic solution. The stirrer was slowed down to 100 rpm and the unpolymerized vinyl chloride was degassed for 90 minutes at 80° C.

After cooling to 30° C., the composition based on a vinyl halide polymer that was obtained was filtered, washed with demineralized water and dried at 50° C. for 24 hours.

EXAMPLE 4R

This example is given by way of comparison.

A. Preparation of the Modifying Polymer (Polymer D)

In a 2 l reactor sparged with nitrogen, 300 g of distilled water, 2.4 g of a 33.3% aqueous polystyrene dispersion with a particle size of 30 nm were introduced and heated to 90° C. under agitation. Then 25 g of a mixture of 200 g of butyl acrylate, 190 g of methyl acrylate and 10 g of t-dodecyl mercaptide (tDDM), 100 g of distilled water, 0.8 g of sodium pyrophosphate and 2 g of sodium dodecyldiphenylethersulfonate were introduced. The balance of the mixture was gradually introduced over a period of 3 hours. In parallel, a solution of 0.8 g of sodium peroxydisulfate in 100 g of water was introduced over a period of 3.5 hours. After an additional period of 30 min at 90° C., the reactor was cooled to room temperature. The obtained dispersion had a solid content of 43.2% and a pH of 5.3.

B. Preparation of the Composition Based on a Vinyl Halide Polymer

Introduced into a 300 l stainless steel reactor equipped with a stirrer were:
103 l of demineralized water;
75 g of hydroxypropyl methyl cellulose sold under the name Metocel 181;
63 g of sodium tripolyphosphate;
24.5 g of t-butyl perneodecanoate;
31.5 g of dilauryl peroxide; and
0.525 kg of polymer D, in the form of the dispersion of polymer D in water obtained in part A of Example 4R.

The reactor was then sealed, sparged 3 times with nitrogen under a pressure of 12 bar and degassed at atmospheric pressure. It was then put under a partial vacuum equivalent to 400 mbar. The stirrer was rotated at 220 rpm, 70 kg of vinyl chloride were introduced into the reactor and its contents were heated at 64° C. This temperature was kept constant over the duration of the polymerization.

At the end of the polymerization, when the pressure had decreased by one bar so when the conversion rate is 79%, the reaction was stopped by injecting 200 ppm of the product Bisphenol A as a 50% methanolic solution. The stirrer was slowed down to 100 rpm and the unpolymerized vinyl chloride was degassed for 90 minutes at 80° C.

After cooling to 30° C., the composition based on a vinyl halide polymer that was obtained was filtered, washed with demineralized water and dried at 50° C. for 24 hours.

Listed in the table 1 below is the data specific to each example.

The properties mentioned in this table 1 for the acrylic ester polymers and for the composition based on a vinyl halide polymer that were obtained were measured as indicated below.

Acrylic Ester Polymer

The "K-value" was measured on a 0.5 wt % solution of polymer in cyclohexanone with an Ubbelohde microviscometer according to the DIN 51562 standard.

Composition Based on a Vinyl Halide Polymer

The average particle size was measured with a Malvern Instruments device using laser diffraction according to the ISO 13320 standard.

The bulk density was measured according to the DIN 53466 standard.

The thermal stability was expressed by the time taken by a sample of the composition placed in a Heraeus Type UT 6200 open chamber heated at 180° C. to change from a light yellow colouration to a dark brown/black colouration.

The transparency was expressed by the ratio (in %) of the incident light beam to the reflected light beam measured by a Zeiss PMQ 3 photometer.

The colouration was expressed in CIELab units and measured with a Hunterlab XE spectrophotometer using D65 radiation and an observation angle of 2°.

The yellowness index was measured according to the DIN 6167 standard.

The whiteness index was calculated from the values Y, y and x of a sample of the composition delivered by a Minolta CR 200 Chroma Meter machine, calibrated according to the Minolta CR-200/-300 S. No. 12633171 standards and an observation angle of 2°. The whiteness index is the result of the equation: $[4.100+0.847 Z]$, the value of Z being provided by the equation: $[((Y/y)-x)\cdot((Y/y)-Y)]$.

The adhesion to the calendering rolls was measured in the following manner: using a spatula, 50 g of the composition were premixed with 0.5 g of a tin-based stabilizer (product IRGASTAB®17 MOK from Ciba) in an enamel container. A Berstorff laboratory mill was heated at 190° C. after cleaning the steel rolls with lead-stabilized PVC granules and a (Vim type) household cleaning product, removing the cleaning products and rubbing the rolls with a cloth. After spreading the stabilized composition in the nip separating the rolls, set at 0.5 mm, the mill was operated at 15 rpm; the film formed was detached, rolled up and reintroduced into the nip. This sequence of manipulations was continued until the appearance of a strong adhesion (bonding) of the film to the rolls (time noted in minutes). The test was interrupted if no adhesion was observed after 30 minutes.

TABLE 1

| | Example 1 | Example 2R | Example 3R | Example 4R |
|---|---|---|---|---|
| n-butyl acrylate/methyl acrylate/t-DDM weight proportions | 61.6/38.4/- | 60/37.5/2.5 | 60/37.5/2.5 | 50/47.5/2.5 |
| Ratio of the weight (kg) of acrylates to the volume (l) of isopropanol | 3.16/1 | | | |
| "K-value" of the acrylic ester polymer | 18.9 | 18.4 | 18.4 | 15.6 |
| Viscosity of the solution of the acrylic ester polymer in the liquid medium of polymerization (mPa · s) (23° C.) (solution at 77.3% by weight of polymer) | 318 | 1020 | 1020 | |

| Modifier | Polymer A | Polymer B | Polymer C | Polymer D |
|---|---|---|---|---|
| % by weight of modifier relative to the weight of vinyl chloride | 1.3 | 1.3 | 0.75 | 0.75 |
| % by weight of modifier relative to the weight of polyvinyl chloride | 1.65 | 1.65 | 0.95 | 0.95 |
| Properties of the composition, based on a vinyl halide polymer, obtained | | | | |
| Average particle size (μm) | 125 | 121 | 127 | 132 |
| Bulk density (kg/l) | 0.633 | 0.647 | 0.646 | 0.501 |
| Thermal stability (min) | 80 | 80 | | |
| Transparency (%) | 89 | 88 | | |
| Colouration | L: 79.9 a: −0.2 b: 7.8 | L: 77.4 a: 0.8 b: 10.9 | | |
| Yellowness index | 16.4 | 24.1 | | |
| Whiteness index | 25.8 | 12.6 | | |
| Adhesion to the calendering rolls (min) | >30 | 28 | | |

These results show the advantages of the compositions according to the invention from the four-fold viewpoint of the viscosity (lower), the reduction of parasitic colourations, the reduced adhesion to the calendering rolls and the higher bulk density.

EXAMPLES 5R, 6R AND 7

Examples 5R and 6R are given by way of comparison.

EXAMPLE 5R

An extrudable composition was manufactured by introducing the following ingredients into a rapid mixer (up to a temperature of 90° C.):
   100 parts by weight of a vinyl chloride homopolymer having a "K-value" (measured according to the ISO 1628-2 standard) of 57, sold by SolVin under the name S 257 RF;
   2.5 parts by weight of a ("one pack") Ca/Zn stabilizer;
   1 part by weight of a processing aid sold by Rohm & Haas under the name Paraloïd K-125;
   2.75 parts by weight of a lubricant comprising a dicarboxylic ester of a saturated fatty alcohol; and
   10 parts by weight of natural calcium carbonate.

To this premix, cooled to 40° C., in a rotary drum, were added 116 parts by weight of wood powder (Lignocel C250 S product sold by Rettenmeier), previously dried at around 100° C. for 24 hours.

Finally the composition obtained was granulated at 100° C. in a Kahl machine equipped with a 3 mm die and driven with a rotation speed of 112 rpm.

This composition (composition 5R) was then extruded in a KMD 25 counter-rotating twin-screw extruder (barrel temperature profile: zone 1: 160° C.; zone 2: 160° C.; zone 3: 160° C.; zone 4: 175° C.; screw temperature: 130° C.; die temperature: 180° C.) rotating at 30 rpm with a throughput of 7 kg/hour.

EXAMPLE 6R

A composition (composition 6R) was manufactured and extruded as in Example 5R, except that the vinyl chloride homopolymer was replaced by a vinyl chloride homopolymer having a "K-value" of 60, sold by SolVin under the name S 260 RF.

EXAMPLE 7

A composition (composition 7) was manufactured and extruded as in Example 5R, except that the vinyl chloride homopolymer was replaced by the vinyl chloride polymer having a "K-value" of 60 prepared as described in Example 1.

The material conditions of the extrusion and the mechanical properties of the extruded compositions are listed in Table 2 below.

TABLE 2

| Extruded composition | | 5R (comparison) | 6R (comparison) | 7 (invention) |
|---|---|---|---|---|
| Extrusion conditions | | | | |
| Motor torque | % | 29 | 27 | 28 |
| Specific energy | Wh/kg | 69 | 64 | 66 |
| Pressure in the extruder head (end of screw) | bar | 220 | 218 | 177 |
| Mechanical properties of the extruded compositions | | | | |
| Flexural modulus (according to ASTM D 790) | MPa | 5100 | 5580 | 5250 |
| Tensile strength (according to ASTM D 638) | MPa | 5440 | 6060 | 5300 |
| Heat deflection temperature (HDT) | ° C. | 77.1 | 80.1 | 78.5 |

These results show the advantages obtained during the extrusion of the compositions according to the invention: with a good aptitude for gelation, these compositions create a substantially lower pressure in the extruder head, at comparable motor torque and specific energy, without deterioration of the mechanical properties. It is therefore possible, by virtue of the compositions according to the invention, to obtain, at higher speed, extruded objects with mechanical properties comparable to those of the prior art.

The invention claimed is:

1. A method for forming a polymer composition, the method comprising:
   forming an acrylic ester polymer by polymerizing at least one acrylic ester in a solution having a liquid medium comprising at least one chain transfer agent selected from the group consisting of $C_3$-$C_{20}$ hydrocarbons having at least one secondary alcohol function, wherein a ratio of the weight of the at least one acrylic ester (kg) to the volume of the at least one chain transfer agent (l) is greater than or equal to 1.5/1 and less than or equal to 5/1; and
   forming a blend comprising the acrylic ester polymer and a vinyl halide polymer by polymerizing at least one vinyl halide monomer in an aqueous suspension comprising at least a portion of the acrylic ester polymer and at least a portion of the at least one chain transfer agent.

2. The method of claim 1, wherein the vinyl halide monomer is a vinyl chloride monomer.

3. The method of claim 1, wherein the at least one vinyl halide monomer is polymerized with at least one comonomer.

4. The method of claim 1, wherein the acrylic ester polymer is a polymer of acrylic acid esters derived from $C_1$-$C_8$ aliphatic monoalcohols.

5. The method of claim 1, wherein the liquid medium consists essentially of the at least one chain transfer agent.

6. The method of claim 1, wherein the chain transfer agent is selected from the group consisting of $C_3$-$C_8$ hydrocarbons containing one secondary alcohol function.

7. The method of claim 1, wherein the chain transfer agent is selected from the $C_3$-$C_{20}$ hydrocarbons containing only one secondary alcohol function.

8. The method of claim 1, wherein the chain transfer agent is selected from aliphatic $C_3$-$C_8$ hydrocarbons containing only one secondary alcohol function.

9. The method of claim 1, wherein the chain transfer agent is selected from aliphatic $C_3$-$C_6$ hydrocarbons containing only one secondary alcohol function.

10. The method of claim 1, wherein the at least one chain transfer agent is selected from the group consisting of isopropanol, sec-butyl alcohol, 2-pentanol, 2-hexanol, 2-heptanol and 2-octanol.

11. The method of claim 1, further comprising: incorporating a natural organic filler into the blend.

12. The method of claim 11, wherein the natural organic filler is low-density or high-density wood, in the form of flour or fibres.

13. Article or part of article comprising a polymer composition formed according to claim 1.

14. A method for manufacturing sheets or films, the method comprising: forming a polymer composition according to claim 1; and calendaring the polymer composition to form a sheet or a film.

15. A method for manufacturing a profile, the method comprising:
   forming a polymer composition according to the method of claim 1; and extruding the polymer composition to form a profile.

* * * * *